United States Patent Office 3,481,185
Patented Dec. 2, 1969

3,481,185
CORE TESTING
William B. Ittner III, Poughkeepsie, N.Y., assignor to International Business Machines Corporation, Armonk, N.Y., a corporation of New York
Filed July 14, 1967, Ser. No. 653,399
Int. Cl. G01n 29/04
U.S. Cl. 73—67.2        2 Claims

ABSTRACT OF THE DISCLOSURE

Square loop magnetic memory cores are tested by generating ultrasonic frequencies in which acceptable cores resonate, by directing ultrasonic vibrations toward a core under test, and by detecting varying magnetic fields from the vibrating core as electric currents in a pickup wire. The current is measured to determine whether it has reached a level which indicates that the magnetic memory core is resonating. Comparing equipment interconnects the generator and the current measuring device to determine whether resonance occurs at an applied frequency within a range of ultrasonic frequencies in which acceptable memory cores resonate.

---

Figure 1:
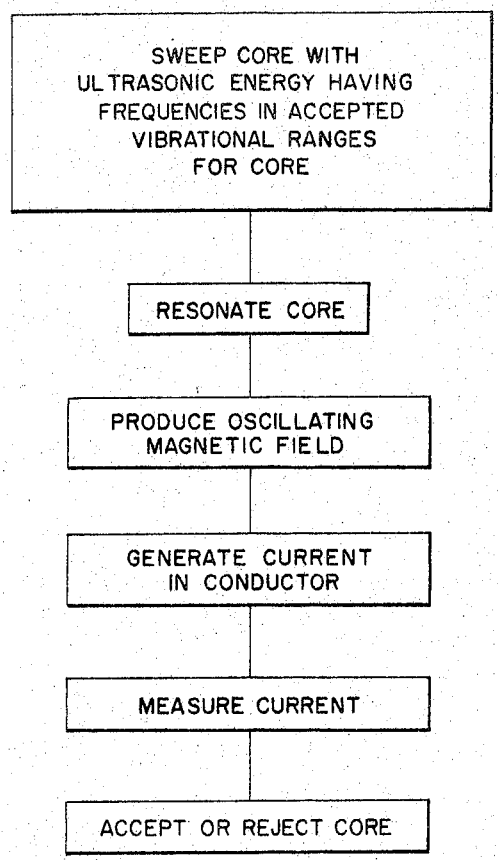

Magnetic core soundness testing methods and apparatus having ultrasonic vibration generators which produce vibrations in a range in which sound cores resonate and having wires adjacent the cores for producing current flow in relation to vibrations of the cores and resultant variations in magnetic fields of the cores and means measuring the current flow in the wires to determine whether the core has resonated under the influence of the applied vibrations are described herein.

This invention concerns the testing of magnetic devices to determine whether they have cracks, chips or other apparent or latent defects which would impair the usefulness of the devices. More particularly, this invention concerns the testing of magnetic memory cores for the screening out of weak or physically damaged cores by applying to the cores vibrations at which sound cores, cores without defects, should resonate. Cores are then accepted or rejected according to the magnetic signal which is produced by the cores and which is sensed as current in wires adjacent the cores.

In computers it is essential that core memories have uniformity of performance. Consequently, cores must be inspected and tested prior to use, and they must be free from defects which result in failure and imperfect operation of the cores.

A problem in ferrite core memory manufacturing is the screening out of weak or damaged cores. Damage may be in the form of chipped or cracked cores or partially cracked cores which deteriorate as the cracks propagate during use. Other inconsistencies or foreign inclusions may prevent satisfactory operation of cores. Heretofore, there has been available no satisfactory testing and inspection techniques to discover hidden defects in the memory cores.

Conventional memory cores are extremely small devices which are constructed from powders under high heat and pressure. Possibilities for inconsistencies of a material occur in the manufacturing process, and the extremely small size renders macroscopic and even microscopic inspections difficult and ineffectual. X-ray inspection techniques are possible, but the extremely small size renders results unreliable. Extremely small defects, which might go unnoticed in X-ray inspection, might adversely affect operation of the cores.

Conventional inductance tests employing simultaneous coils prove oversensitive to some defects and insensitive to others. In one conventional method of testing cores, a predetermined driving field is applied to switch the magnetism of the core. The voltage that accompanies the flux change of the core is a measure of how well the core will operate in a memory, and cores that produce a specified voltage are accepted. For example, a mechanical flaw could reduce the cross sectional area of a core and thereby reduce the flux of the core. Such a core would be rejected in conventional tests. However, certain kinds of mechanical flaws do not show up on the conventional tests. For example, a core might have a crack running parallel to the flux. Such a core could produce a strong signal but later fail in an operating memory.

It has been found that a close correlation exists between natural frequency and acoustic resonance of memory devices and their soundness and operational characteristics. Sound and acceptable cores of similar dimensions resonate within a close range of vibrations. Accordingly, the present invention provides apparatus and methods for testing cores in which cores are subjected to ultrasonic vibrations of a range in which operationally acceptable cores resonate. Resonance of the magnetic cores produces a shifting field which is sensed by conductors. The outputs of the conductors are signals which, upon being measured or displayed, indicate whether the cores have resonated at degrees which indicate that they are sound and acceptable.

The proposed method includes the use of magnetostrictive resonances of the cores to ascertain soundness. If cores are driven with appropriate applied magnetic fields, the cores will resonate. Conversely, if resonant oscillations are induced in the cores, oscillating magnetic fields will result. The method of screening cores comprises sweeping the cores with ultrasonic fields having frequencies spanning accepted vibrational ranges for the cores. Cores are then rejected or accepted on the basis of magnetic signal output which is sensed by conductors in the magnetic fields adjacent the cores.

A purpose of this invention is to provide a simple, inexpensive, nondestructive test to detect mechanically damaged and, more specifically, latently damaged cores.

An objective of this invention is the provision of a testing method using a range of ultrasonic energy applied to cores to produce resonance which in turn produces an oscillating field which is sensed by a conductor.

This invention has as another objective the provision of an ultrasonic sweep generator for resonately vibrating a magnetic device and a detector for indicating whether a device has resonated.

Figure 2:
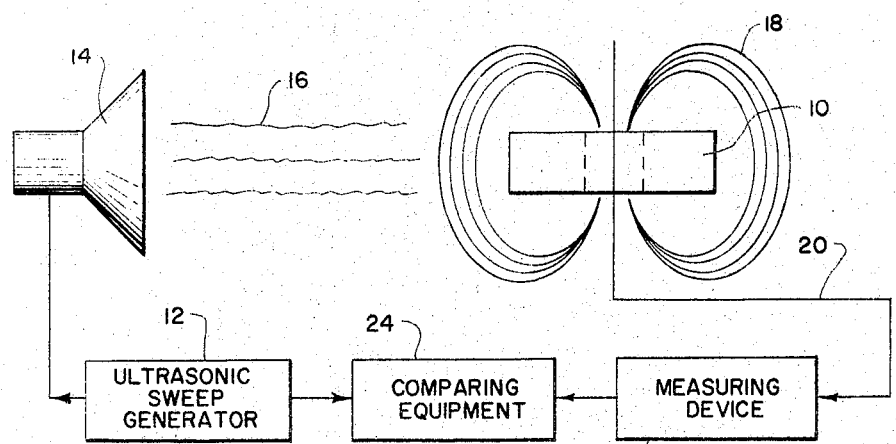

The foregoing and other objectives, features and advantages of this invention will be apparent from the following more particular description of preferred embodiments of the invention as illustrated in the accompanying drawings in which:

FIGURE 1 is a chart of the steps of performing the magnetic memory core testing method; and FIGURE 2 is a schematic representation of core testing apparatus.

Referring to the drawings, FIGURE 1 illustrates a preferred method for testing a magnetic memory core. The first step in the process involves sweeping the core with ultrasonic waves having frequencies in accepted vibrational ranges for sound cores. The particular frequencies may be predetermined empirically or mathematically from dimensions and materials of the core.

If the core is sound, the applied ultrasonic energy causes the core to resonate, and the core produces an oscillating magnetic field. Current is caused to flow in a conductor within the magnetic field, and the current is measured to determine whether the core has resonated. If it has, the core is accepted; if an unacceptable current has been produced, the core is rejected.

In FIGURE 2, a greatly enlarged core is schematically represented at numeral 10. An ultrasonic sweep generator 12 controls the output of a dynamic speaker 14, which produces ultrasonic waves 16. When waves vibrate core 10 at a frequency which causes the core to resonate, an oscillating magnetic field 18 is produced. The oscillating field effects current flow in wire 20. Current measuring device 22 indicates whether core 10 has resonated, and comparing equipment 24 may compare the signal produced by wire 20 with the frequency applied to core 12 by ultrasonic energy 16. On the basis of the measured current flow in wire 20, core 10 may be accepted or rejected.

FIGURE 2 shows the wire 20 threaded through the tested core. From a more general standpoint, the wire ie located to be linked by flux of the core. The term "adjacent" will be used to indicate this relationship.

The method is also useful with other means for producing the mechanical vibrations in the tested core. For example, the cores can be subjected to a magnetic impulse of the appropriate frequency components. Such a magnetic field can be provided by a current on the test wire 20 or by a wire otherwise suitably positioned with respect to the core.

While the invention has been particularly shown and described with reference to preferred embodiments thereof, it will be understood by those skilled in the art that various changes in form and detail may be made therein without departing from the spirit and scope of the invention.

What is claimed is:

1. The testing method for determining apparent and latent defects of square loop magnetic memory cores comprising the steps of: providing square loop magnetic memory cores in a test area, generating ultrasonic frequencies, producing ultrasonic vibrations with a dynamic speaker, applying the generated ultrasonic vibrations to the memory cores undergoing test, varying the frequency of the generated ultrasonic vibrations within a narrow predetermined range which causes resonance in acceptable memory cores, thereby creating vibrations in the memory cores and resonating memory cores which are free from latent and apparent defects upon generating vibrations related to natural frequencies of the memory cores, and creating oscillating magnetic fields upon vibrating the memory cores, positioning wires in the oscillating magnetic fields adjacent the memory cores, thereby creating currents in the wires with the oscillating magnetic field from the vibrating memory cores, sensing and measuring the currents in the wires, and comparing the currents with simultaneously generated ultrasonic frequencies, thereby determining whether the memory cores resonate in a range of ultrasonic frequencies in which acceptable cores resonate.

2. Apparatus for testing square loop magnetic memory cores for the presence of apparent and latent defects in the cores comprising:
an ultrasonic frequency generator for generating a predetermined range of ultrasonic frequencies which influence resonance of acceptable square loop magnetic memory cores,
a dynamic speaker connected to the generator for producing ultrasonic vibrations having frequencies controlled by the generator and for directing vibrations produced by the generator to a square loop magnetic memory core disposed in the test apparatus, thereby vibrating the memory core and producing a varying magnetic field therefrom,
a pickup wire positioned in the varying magnetic field adjacent the memory core, whereby electric current is produced in the wire and flows in the wire in response to the varying of the magnetic field,
current measuring means connected to the wire for determining the magnitude of current flow within the wire, thereby indicating whether current is at a level which is indicative of oscillating magnetic field being produced by an acceptable memory core resonating at frequencies of the applied ultrasonic vibrations,
and comparing equipment connected to the generator and to the current measuring means for comparing the generated frequency and the produced current for determining whether the memory core undergoing test resonates at an applied ultrasonic frequency within a range of ultrasonic frequencies in which acceptable memory cores resonate.

References Cited

UNITED STATES PATENTS

| | | | |
|---|---|---|---|
| 2,848,775 | 8/1958 | Ettenreich | 73—67.2 XR |
| 1,543,124 | 6/1925 | Ricker | 73—67.2 XR |
| 2,306,137 | 12/1942 | Pabst et al. | 73—67.2 XR |

RICHARD C. QUEISSER, Primary Examiner

JOHN R. FLANAGAN, Assistant Examiner